3,235,584
PROCESS FOR PRODUCING ORGANIC PEROXYACIDS
John H. Blumbergs, Highland Park, N.J., assignor to FMC Corporation, New York, N.Y., a corporation of Delaware
No Drawing. Filed June 28, 1962, Ser. No. 205,843
7 Claims. (Cl. 260—502)

This invention relates to the preparation of substituted organic peroxyacids by reaction of their precursor, organic acid halides, with aqueous alkaline hydrogen peroxide solutions.

Organic peroxyacids are well known as oxidizing agents in the preparation of oxirane compounds. Lower aliphatic peroxyacids, such as peracetic acid and performic acid, are well known and commercially available for such purposes. However, certain higher molecular weight aliphatic and aromatic peroxyacids, and particularly the highly active, substituted peroxyacids, are not generally available because of the relatively high cost of producing these peracids. This is due, in large measure, to the low yields of high molecular weight organic peracids which are obtained by known processes.

One method for obtaining acceptable yields of peroxybenzoic acid is to react benzoyl chloride with a sodium peroxide solution at 0° C. to 5° C. for about 6 hours. The product is recovered as the sodium salt of peroxybenzoic acid. This reaction is illustrated by the following equation.

Equation 1

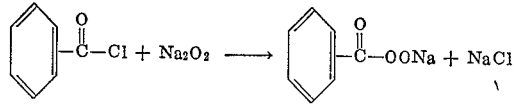

While the yields obtained by this process are satisfactory, on the order of 85 to 90%, this process cannot be employed with substituted acid chlorides, e.g., chlorobenzoyl chloride, to give acceptable yields. The low yields are due to increased hydrolysis of the substituted acid chlorides in highly basic hydrogen peroxide solutions; the hydrolysis results in side-product formation and is illustrated by the following equation:

Equation 2

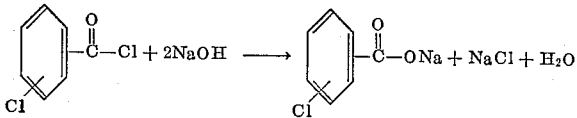

A reduction in the yield is also obtained because of the long reaction times required in this process. Extended reaction periods permit the somewhat unstable substituted sodium peroxybenzoates to decompose to substituted sodium benzoates in the highly alkaline medium.

In view of the low yields, this process has not been accepted for commercial preparation of substituted peroxycarboxylic acids. As a result, there has been a need for a process which can produce substituted aromatic peroxyacids in high yields and which can be applied to produce a variety of higher molecular weight substituted organic peracids.

It is an object of the present invention to prepare substituted high molecular weight organic peracids, including aromatic, cycloaliphatic and aliphatic peracids from their precursor acid halides in high yields and with minimum side products.

This and other objects will be apparent from the following disclosure.

It has now been found that high molecular weight organic acid halides having the formula:

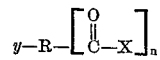

in which $n$ is an integer of 1 to 2, X is a halogen ion, $y$ is either a halide, $NO_2$, $C \equiv N$, alkoxy group containing 1 to 4 carbon atoms, or an aliphatic group containing 1 to 4 carbon atoms, and R is an organic residue which is either (a) An aliphatic group containing from 1 to about 12 carbon atoms, or
(b) A cycloaliphatic group containing from 3 to about 12 carbon atoms, or
(c) an aromatic group, can be reacted with aqueous solutions of alkali metal or alkaline earth metal peroxides having an active oxygen content of at least about 2% by weight to yield the resultant peroxycarboxylic acid salt, in high yields and without hydrolysis or other side reactions of the acid halide, provided that a small amount of the product, i.e., an alkali metal or alkaline earth metal salt of the peroxycarboxylic acid, is present in the reaction mixture (on the order of at least about 1% by weight of the reaction mixture) prior to mixing of the organic acid halide and the aqueous solution of alkali metal or alkaline earth metal peroxide, and that the entire reaction is carried out in the presence of said alkali metal or alkaline earth metal salt of the peroxycarboxylic acid. These salts are separated and acidified to form the peroxycarboxylic acid.

The virtual elimination of side reactions with a resultant increase in yields is completely unexpected. This is believed due to the reaction of the alkali or alkaline earth metal salt of the peroxycarboxylic acid product with the precursor acid halide, in accordance with the following equation:

Equation 3

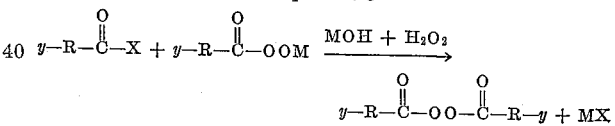

where M is an alkali metal or alkaline earth metal

The reaction expressed by Equation 3 proceeds at a considerably faster rate than the comparable reaction of the organic acid halide with the alkaline hydrogen peroxide solution, and thus virtually eliminates hydrolysis of the halide. The diacyl peroxide product of Equation 3 is then available for reaction with the alkaline hydrogen peroxide solution to form the principal product, a metal salt of the peroxycarboxylic acid. This reaction takes place according to the following equation:

Equation 4

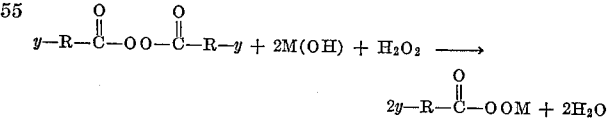

It is critical in this process that the alkali or alkaline earth metal salt of the peroxycarboxylic acid be added to the alkaline hydrogen peroxide solution prior to the addition of the organic acid halide in order to prevent hydrolysis of the acyl halide. Side reactions of the organic acid halides and the alkaline hydrogen peroxide solution apparently take place, to a large extent, during the initial phases of the reaction. These side reactions, including the hydrolysis of the organic acid halides, diminish the yield of product to a large extent and must be avoided.

In carrying out the process, the alkaline hydrogen peroxide solution is made up by mixing a dilute solution of either an alkali metal or an alkaline earth metal hydroxide with a solution of hydrogen peroxide. It can also be made up by dissolving an alkali metal or alkaline earth metal peroxide, e.g., $Na_2O_2$, in water. In either case, the resulting solution is identical. This reaction mixture is maintained at temperatures of between about −10 to +20° C. and preferably at from 0° C. to +10° C. Thereafter, at least about 1% by weight of the product, an alkali metal or alkaline earth metal salt of the peroxycarboxylic acid, is added with high agitation. For ease of operation, the peroxycarboxylic acid salt can also be added in the form of its diacyl peroxide; the peroxycarboxylic acid salt is produced in-situ by cleavage of the diacyl peroxide in the reaction medium as per Equation 4. The organic acid halide is then added to the reaction mixture slowly and the reaction is completed under vigorous agitation. This normally takes about 1 hour. Thereafter, the salt of the peroxycarboxylic acid is neutralized to obtain the peroxycarboxylic acid.

In the above process, the alkali metal peroxide solution should have an active oxygen content of at least about 2.0% and preferably no higher than 2.50% by weight. Higher active oxygen contents can be employed if the salt of the peroxycarboxylic acid produced has sufficient solubility in the reaction mixture. Peroxide solutions having excessively high active oxygen contents should be avoided because they prevent the salt of the peroxycarboxylic acid from dissolving in the reaction mixture; the resultant thick slurries prevent effective stirring and good reaction rates. When the active oxygen content of the alkaline peroxide solution is lower than about 2.0%, the diacyl peroxide, which is formed according to Equation 3, may be cleaved in part to the corresponding carboxylic acid and thus lowers the yield of peroxycarboxylic acid. In contrast, at active oxygen contents above about 2.0%, the diacyl peroxide cleaves into two moles of the metal salt of the peroxycarboxylic acid.

The reaction is best carried out at temperatures of about −10° C. to +20° C. and preferably at 0° C. to 10° C. Higher reaction temperatures can also be employed. However, as the temperature increases, the stability of the salts of the organic peroxyacids decreases and they can be converted more readily to the resultant organic carboxylic acids. Accordingly, the use of higher temperatures must be conditioned upon the stability of the particular metal salt of the organic peroxyacid being produced. Temperatures lower than 0° C. can be employed without fear of increased decomposition of the product. However, as the temperature decreases, the solubility of the salt of the organic peroxyacid decreases. This results in the formation of thick slurries which are objectionable because they prevent good stirring and high reaction rates. The thick slurries can be avoided by reducing the amount of acyl halide which is processed at these low temperatures, but this is undesirable since the producing capacity of the reaction vessel is thereby decreased.

The substituted organic acyl halides which can be reacted according to this process are the aromatic halides, cycloaliphatic halides containing from 3 to 12 carbon atoms and aliphatic halides containing from 1 to about 12 carbon atoms in the molecule. Examples of suitable substituted organic acyl halides include o-chlorobenzoyl chloride, m-chlorobenzoyl chloride, p-chlorobenzoyl chloride, 2,4-dichlorobenzoyl chloride, 3,4-dichlorobenzoyl chloride, m-nitrobenzoyl chloride, p-nitrobenzoyl chloride, p-cyanobenzoyl chloride, p-methylbenzoyl chloride, p-methoxybenzoyl chloride, m-bromobenzoyl bromide, 1-chloro-2-naphthoyl chloride, 4-chloro-isophthalyl chloride, α-chloropropionyl bromide, α-cyanopropionyl chloride, α-methoxypropionyl chloride, α-nitropropionyl chloride, 2-chlorocyclohexanecarbonyl chloride, p-tertiary butoxybenzoyl chloride and p-isopropoxybenzoyl chloride.

Conversion to the peroxycarboxylic acid is dependent upon the cleavage of the in-situ formed diacyl peroxide by the alkaline hydrogen peroxide solution. Some of the diacyl and diaroyl peroxides, e.g., o-chlorobenzoyl peroxide, m-chlorobenzoyl peroxide, p-nitrobenzoyl peroxide and m-nitrobenzoyl peroxide, cleave very easily. As a result, high conversion to the salt of the peroxycarboxylic acids are obtained per pass through the system. Some of the intermediate formed peroxides, in contrast, are more stable and will be cleaved more slowly by the alkaline peroxide solution. Examples of such diacyl peroxides are those derived from p-chlorobenzoyl peroxide, 2,4-dichlorobenzoyl peroxide, 3,4-dichlorobenzoyl peroxide, α-chlorolauryl peroxide and α-chloronaphthoyl peroxide. However, these diacyl peroxides can be recycled for reaction with fresh hydrogen peroxide solution to yield the corresponding salts of the peroxycarboxylic acids.

The process can be carried out either in batch form, as described above, or in a continuous process. In either operation, the reaction must commence in the presence of the alkali metal or alkaline earth metal salt of the peroxycarboxylic acid being produced to avoid side product formation. In the case of a continuous process, the organic acyl halide is continually added to the reactor along with the alkaline hydrogen peroxide solution. A small amount of the peroxycarboxylic acid salt is added at the start up of the reaction and is maintained in the reaction zone by recycling any diacyl peroxide which has not been converted to the final product. This diacyl peroxide, upon being recycled to the reactor, is cleaved by the alkaline hydrogen peroxide solution to form additional product, in accordance with Equation 4. As in the batch process, the continuous process must contain sufficient amounts of the salt of the peroxycarboxylic acid during the reaction to prevent hydrolysis of other side reactions of the organic acid halide with the alkaline hydrogen peroxide solution. The peroxycarboxylic acid salt is continuously removed from the reactor and acidified to produce the final product. Any acid which does not react with the product can be employed, such as sulfuric or phosphoric acid.

In this process, the feed ingredients are reacted in the absence of a solvent so that the reaction takes place in a heterogeneous system. In order to promote good contact between the feed reactants, a vigorous agitation system is employed.

The following examples are presented by way of illustration only and are not deemed to be limiting of the present invention.

*Example I*

*Run A.*—In a two-liter, four-neck Morton flask equipped with an efficient stirrer was placed 42.0 g. of sodium hydroxide dissolved in 320 ml. of water. The solution was cooled to +4° C. and 34.0 g. of 50% hydrogen peroxide was added. Then 16.0 g. of solid o-chlorobenzoyl peroxide was added and the mixture was stirred for 5 minutes at +2° to +4° C. Then 70.0 g. of o-chlorobenzoyl chloride was slowly added with vigorous agitation while maintaining the temperature of the reaction mixture at 2° to 4° C. The reaction mixture was stirred at these conditions for an additional 55 minutes and then 500 ml. of water was added to dissolve all of the sodium salt of o-chloroperoxybenzoic acid formed. The reaction mixture was filtered to separate the solid o-chlorobenzoyl peroxide which is the precursor of the final product, o-chloroperoxybenzoic acid, from the soluble sodium salt of o-chloroperoxybenzoic acid.

Thirty and a half grams of o-chlorobenzoyl peroxide was obtained as solids on the filter. The filtrate was acidified with sulfuric acid and extracted with organic solvent; 51.3 g. of o-chlorobenzoic acid was obtained.

The yield of total useful products, i.e., o-chloroperoxybenzoic acid and o-chlorobenzoyl peroxide, was 98.0% of theory.

*Run B.*—Using the same procedure as described in Example I, Run A, a reaction flask was charged with 25.0 g. of NaOH, 270 ml. of water, 29.0 g. of 50% hydrogen peroxide; 75.4 g. of o-chlorobenzoyl chloride was slowly added with vigorous agitation while maintaining the temperature of the reaction mixture at +2° to +4° C. After 60 minutes reaction time, 23.4 g. of o-chloroperoxybenzoic acid and 27.6 g. of o-chlorobenzoyl peroxide was obtained. The yield of useful product was only 73.0% of theory. A large amount of undesirable side product o-chlorobenzoic acid was present in the crude o-chloroperoxybenzoic acid product.

*Example II*

Run A.—Using the procedure described in Example I, a one-liter, three-neck Morton flask was charged with 23.1 g. of NaOH, 176 ml. of water, 19.25 g. of 50% hydrogen peroxide and 4.0 g. of m-chlorobenzoyl peroxide. Then 39.3 g. of m-chlorobenzoyl chloride was slowly added with vigorous agitation while maintaining the temperature at +2° to +4° C. After 60 minutes of reaction there was obtained 26.0 g. of m-chloroperoxybenzoic acid and 14.5 g. of m-chlorobenzoyl peroxide, giving a yield of useful products of 95.8% of theory.

Run B.—A second run was carried out in the same manner as Run A except that the reaction flask was charged with 17.5 g. of NaOH, 160 ml. of water and 17.5 g. of 50% $H_2O_2$. Then 37.7 g. of m-chlorobenzoyl chloride was added. There were obtained only 13.1 g. of m-chloroperoxybenzoic acid and 11.0 g. of m-chlorobenzoyl peroxide, giving a yield of useful products of 68.5% of theory.

*Example III*

Using the same procedure as Example I, Run A, a reaction flask was charged with 42.0 g. of NaOH, 365 ml. of water, 37.5 g. of 50% $H_2O_2$ and 16.0 g. of p-chlorobenzoyl peroxide. Then 70.0 g. of p-chlorobenzoyl chloride was added with vigorous agitation while maintaining the temperature of the reaction mixture at +2° to +4° C. After 60 minutes of reaction, 26.2 g. of p-chloroperoxybenzoic acid and 48.0 g. of p-chlorobenzoyl peroxide were obtained, giving a yield of useful products of 90.0% of theory.

*Example IV*

Run A.—Using the same procedure as Example I, Run A, a reaction flask was charged with a reaction mixture containing 30.0 g. of NaOH, 220 ml. of water and 24.7 g. of 50% hydrogen peroxide. To this reaction mixture was added 2.46 g. of solid m-nitroperoxybenzoic acid. Then 48 g. of finely powdered m-nitrobenzoyl chloride was added with vigorous agitation while maintaining the temperature of the reaction mixture at +2° to +4° C. There were obtained 57.8 g. of m-nitroperoxybenzoic acid (87.2% yield) and 2.0 g. of unreacted material (3.4% yield) which consisted approximately of 60% m-nitrobenzoyl peroxide and 40% m-nitrobenzoyl chloride. The total yield of useful product was 90.6% of theory.

Run B.—A second run was carried out in the same manner as Run A except that the 2.46 g. of m-nitroperoxybenzoic acid was not added to the reaction mixture before starting to add the acid chloride. In this case, only 40.3 g. of m-nitroperoxybenzoic acid (70.7% yield) and 1.6 g. of unreacted material (3.0% yield) were obtained, giving a yield of useful products of only 73.7% of theory.

*Example V*

Using the same procedure as Example IV, Run A, 2.46 g. of p-nitroperoxybenzoic acid was added to the reaction mixture before adding 58.0 g. of finely powdered solid p-nitrobenzoyl chloride. There were obtained 44.9 g. of p-nitroperoxybenzoic acid (74.2% yield) and 8.5 g. of unreacted material (16.4% yield).

*Example VI*

Using the same procedure as Example IV, Run A, 2.5 grams of p-cyanoperoxybenzoic acid was added to the reaction mixture. Thereafter, 52 grams of p-cyanobenzoyl chloride was slowly added while maintaining the temperature of the reaction mixture at 2° to 6° C. There were obtained as product 47.5 grams of p-cyanoperoxybenzoic acid and 3.0 grams of unreacted material. The total yield of useful products was 92.0% of theory.

*Example VII*

Using the same procedure as Example IV, Run A, 2.5 grams of p-methoxyperoxybenzoic acid was added to the reaction mixture. Thereafter, 53.4 grams of anisoyl chloride was added. A product mixture was obtained containing 39.0 grams of p-methoxyperoxybenzoic acid and 10.8 grams of p-methoxybenzoyl chloride, giving a yield of useful products of 94.3% of theory.

*Example VIII*

Using the same procedure as Example IV, Run A, 2.5 grams of p-methylperoxybenzoic acid was added to the reaction mixture before adding 49.0 grams of p-methylbenzoyl chloride. A product mixture of 32.5 grams of p-methylperoxybenzoic acid and 14.0 grams of p-methylbenzoyl peroxide was obtained, giving a yield of useful products of 95% of theory.

*Example IX*

Using the same procedure as Example IV, Run A, 2.5 grams α,α-dichloroperoxylauric acid was added to the reaction mixture before adding 90.0 grams of α,α-dichlorolauroyl chloride. A product mixture was obtained containing 54.5 grams of α,α-dichloroperoxylauric acid and 31.2 grams of α,α-dichlorolauroyl peroxide, giving a yield of useful products of 95.2% of theory.

*Example X*

Using the same procedure as Example IV, Run A, 2.5 grams of 1-chloro-2-peroxynaphthoic acid was added to the reaction mixture before adding 71.0 grams of 1-chloro-2-naphthoyl chloride. A product mixture was obtained containing 58.0 grams of 1-chloro-2-peroxynaphthoic acid and 11.0 grams of α-chloronaphthoyl, peroxide, giving a yield of useful products of 96.3% of theory.

*Example XI*

Using the same procedure as Example IV, Run A, 2.5 grams of m-bromoperoxybenzoic acid was added to the reaction mixture before adding 82.6 grams of m-bromobenzoyl bromide. A product mixture was obtained containing 58.5 grams of m-bromoperoxybenzoic acid and 10.0 grams of m-bromobenzoyl peroxide, giving a yield of useful products of 98.3% of theory.

*Example XII*

Using the same procedure as Example IV, Run A, 3.0 grams of 4-chlorodiperoxyisophthalic acid was added to the reaction mixture before adding 37.2 grams of finely powdered 4-chloroisophthaloyl chloride. A product mixture was obtained containing 36.0 grams of 4-chlorodiperoxyisophthalic acid and 3.0 grams of unreacted material. The 3.0 grams of unreacted material was reacted with fresh alkaline hydrogen peroxide solution and gave an additional 1.8 grams of 4-chlorodiperoxyisophthalic acid. The total yield was 95.7% of 4-chlorodiperoxyisophthalic acid.

*Example XIII*

Using the same procedure as Example IV, Run A, 2.5 grams of 3,4-dichloroperoxybenzoic acid was added to the reaction mixture before adding 66.0 grams of 3,4-dichlorobenzoyl chloride. After reaction for 2 hours under vigorous agitation at from 6° to 8° C., 19.0 grams of 3,4-dichloroperoxybenzoic acid and 44.0 grams of the symmetrical dichlorodibenzoyl peroxide were obtained. The total yield of useful products was 99.0% of theory.

*Example XIV*

Using the same procedure as Example IV, Run A, 2.5 grams of 3-nitrocyclohexaneperoxycarboxylic acid was added to the reaction mixture. Thereafter, 60 grams of 3-nitrocyclohexanecarbonyl chloride was added. After reaction for 1 hour, a product mixture was obtained containing 41.5 grams of 3-nitrocyclohexaneperoxycarboxylic acid and 16.6 grams of symmetrical 3-nitrocyclohexanediacyl peroxide. The yield of useful products was 96.0% of theory.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. A process for producing a substituted organic peroxycarboxylic acid which comprises reacting in about stoichiometric proportions
    (a) a high molecular weight organic acid halide having the formula

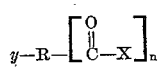

in which $n$ is an integer from 1 to 2, X is a halogen ion, $y$ is selected from the group consisting of a halide, $NO_2$, $C\equiv N$, an alkoxy group having 1 to 4 carbon atoms and an alkyl group containing 1 to 4 carbon atoms, and R is an organic residue which is selected from the group consisting of
    (1) an alkyl group containing from 1 to 12 carbon atoms,
    (2) a phenyl group, and
    (3) a naphthyl group, with
(b) an aqueous solution of a compound selected from the group consisting of alkali metal peroxides and alkaline earth metal peroxides, said solution having an active oxygen content of at least about 2% by weight, wherein said solution contains prior to the addition of (a), at least about 1% by weight of the salt of the final product of said reaction of (a) and (b), said salt being a member of the group consisting of an alkali metal salt and an alkaline earth metal salt of the corresponding substituted peroxycarboxylic acid of said organic acid halide;
removing the reaction product of (a) and (b) and acidifying said reaction product to produce the corresponding peroxycarboxylic acid.

2. Process of claim 1 in which the aqueous solution contains from about 2.0 to 2.5% by weight active oxygen and in which said reaction is carried out at a temperature of from about $-10$ to about $+20°$ C.

3. Process of claim 1 in which the substituted organic acid halide is o-chlorobenzoyl chloride and the final product is o-chloroperoxybenzoic acid.

4. Process of claim 1 in which the organic acid halide is m-chlorobenzoyl chloride and the final product is m-chloroperoxybenzoic acid.

5. Process of claim 1 in which the organic acid halide is m-nitrobenzoyl chloride and the final product is m-nitroperoxybenzoic acid.

6. Process of claim 1 in which the organic acid halide is p-nitrobenzoyl chloride and the final product is p-nitroperoxybenzoic acid.

7. Process of claim 1 in which the organic acid halide is 3,4-dichlorobenzoyl chloride and the final product is 3,4-dichloroperoxybenzoic acid.

References Cited by the Examiner
FOREIGN PATENTS 1,177,466 12/1958 France.
1,210,832 10/1959 France.
409,779 2/1925 Germany.

OTHER REFERENCES

Brooks et al., J. Am. Chem. Soc., vol. 55, 1933, pp. 4309–4311.
Price et al., Organic Synthesis, vol. 23, 1943, pp. 65–66.

LORRAINE A. WEINBERGER, *Primary Examiner.*

LEON ZITVER, *Examiner.*